United States Patent [19]

Beer

[11] Patent Number: 5,793,368

[45] Date of Patent: Aug. 11, 1998

[54] METHOD FOR DYNAMICALLY SWITCHING BETWEEN VISUAL STYLES

[75] Inventor: John C. Beer, Oceanside, Calif.

[73] Assignee: TriTeal Corporation, Carlsbad, Calif.

[21] Appl. No.: 747,792

[22] Filed: Nov. 14, 1996

[51] Int. Cl.[6] .................................................... G06F 3/00
[52] U.S. Cl. ........................ 345/334; 345/335; 345/343
[58] Field of Search .................................. 345/326–358, 345/977; 704/8; 395/200.3–200.83, 680, 682, 685

[56] References Cited

U.S. PATENT DOCUMENTS

| | | | |
|---|---|---|---|
| 5,327,529 | 7/1994 | Fults et al. | 345/333 |
| 5,416,903 | 5/1995 | Malcolm | 345/333 X |
| 5,499,335 | 3/1996 | Silver et al. | 345/333 X |
| 5,513,342 | 4/1996 | Leong et al. | 345/333 |
| 5,596,702 | 1/1997 | Stucka et al. | 345/340 |
| 5,600,778 | 2/1997 | Swanson et al. | 345/333 |
| 5,673,403 | 9/1997 | Brown et al. | 345/335 |
| 5,696,914 | 12/1997 | Nahaboo et al. | 345/333 |

*Primary Examiner*—John E. Breene
*Attorney, Agent, or Firm*—Fish & Richardson P.C.

[57] ABSTRACT

A method and system for allowing a user to retrieve a user interface and a visual style from a local or remote storage unit, rapidly display the visual stylized user interface, and dynamically switch between visual styles, without comprising security over a network system. Once displayed, the user can customize or configure the visual style of the user interface. The invention includes a programmable graphics user interface (PGUI). The PGUI is initialized to a default visual style or to a user's preferred style when the user logs onto a network system. In the preferred embodiment, after proper login, a user interface, stored on a server as a description in a text-based User Interface Language (UIL), is transferred to user's client system. The PGUI parses the UIL description and creates the user interface controls defined in the description. The PGUI then uses the currently selected visual style to display the user interface, and then reads any content (e.g., text, images, or other content) for the interface. The PGUI displays the content within the user interface, such as in a scrollable area or any other area described by the UIL. Once the user interface is displayed, the user can change the user interface, save the user interface, change the contents, save the contents, or switch visual styles. Compound or complex user interfaces can be easily created by combining simple user interface components.

12 Claims, 3 Drawing Sheets

METHOD FOR DYNAMICALLY SWITCHING BETWEEN VISUAL STYLES

This invention is related to the inventions entitled "System and Method for Distributing Objects and User Interfaces", and "URL Login", U.S. patent application Ser. No. 08/748,664, filed on the same date as the present patent invention.

BACKGROUND OF THE INVENTION

1. Field of the Invention

This invention relates to computer graphical user interfaces, and more particularly to a graphical user interface having dynamically switchable, user-definable visual styles.

2. Description of Related Art

Present computer systems, such as personal computers and workstations, generally have a graphical user interface (GUI). A GUI allows a user to interact with a computer system by using an input device (e.g., a pointing device such as a mouse or touchpad, a keyboard, or voice control) and icon or graphics-based commands and controls. Presently, different brands of computer systems often use different GUIs. For example, the Windows95 system from Microsoft Corporation differs in "look and feel" from the Macintosh System 7 operating system from Apple Corporation, both of which differ from the Motif GUI often used on UNIX systems. Further, applications that are nominally the same may differ in appearance and interaction depending on platform. Thus, a word processing application on one type of GUI-based system generally looks different from, and requires different user interaction than, the same word processor application designed for a different GUI-based system. For example, Microsoft Word has a different user interface on the Macintosh System 7 operating system than it does under the Windows95 operating system. Such differences present a problem for employers who may have widely disparate types of computer systems, due to the cost of training employees on how to use different user interfaces.

Another problem with current computer systems occurs with networked computer systems. Such systems generally have centrally maintained applications stored on a server computer that are accessed by multiple client computers by means of a networked file system. This type of configuration requires that an entire application be transferred from the server over the network to a client in order for the user to interact with the application. Today's applications are typically 1-2 megabytes in size, and can be significantly larger. Loading such large applications on a server and providing access to multiple users decreases the overall performance of a network. For example, the start-up time alone for such applications can take 60 seconds or more, resulting in a decrease of overall productivity of employees.

Loading applications from servers also presents a security problem. The machine code of an application can be altered in transit or on a server's local storage unit, which could lead to corruption or deletion of a company's sensitive or vital data upon execution of that code.

The design of applications themselves pose some problems for users. A user typically buys an application because it provides some kind of functionality that enables the user to perform a particular task. One of the problems that arises when acquiring prepackaged, or "shrink wrapped", applications is that such applications often provide some of the functionality a user needs but not all of it, or provide more functionality than a user needs, thereby increasing the difficulty of learning applications. Another problem of such applications is that a user generally cannot modify the user interface to make the applications easier to use.

No solution is known to exist to simultaneously deal with all the problems discussed above. Accordingly, there is a need for a method and system to overcome these problems. The present invention provides such a method and system.

SUMMARY OF THE INVENTION

The invention comprises a method and system for allowing a user to retrieve a user interface and a visual style from a local or remote storage unit, rapidly display the visual stylized user interface, and dynamically switch between visual styles, without comprising security over a network system. Once displayed, the user can customize or configure the visual style of the user interface.

The invention includes a programmable graphics user interface (PGUI) that provides visual information about resources and objects throughout a network and on user systems. Objects are presented as icons which a user can manipulate by means of an input device, such as a pointing device, keyboard, touch screen, etc. An object can be opened by selecting the object with an input device (for example, by moving a display cursor over the object icon and double-clicking a mouse button), thereby invoking an associated application for viewing and/or manipulating the object.

The PGUI is initialized to a default visual style or to a user's preferred style when the user logs onto a network system. In the preferred embodiment, after proper login, a user interface, stored on a server as a description in a text-based User Interface Language (UIL), is transferred to user's client system. The PGUI parses the UIL description and creates the user interface controls defined in the description. The PGUI then uses the currently selected visual style to display the user interface, and then reads any content (e.g., text, images, or other content) for the interface. The PGUI displays the content within the user interface, such as in a scrollable area or any other area described by the UIL. Once the user interface is displayed, the user can change the user interface, save the user interface, change the contents, save the contents, or switch visual styles. Compound or complex user interfaces can be easily created by combining simple user interface components.

The invention provides a method to present a user interface with multiple selectable visual styles, and defined in a simple markup-text form that can be quickly retrieved from a server to define a user interface on a client. The invention also reduces security risks inherent when loading applications from servers by avoiding use of machine code in defining a user interface. The invention further provides a method to separate the functionality of user interface controls from the display of the user interface controls, and a method to separate the functionality of an application from the display of the user interface. The invention provides a simple method for adding new functionality and new controls to a user interface. Finally, the invention provides a method for using a plurality of UIL's with the capability of specifying each UIL in a user's native natural language.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
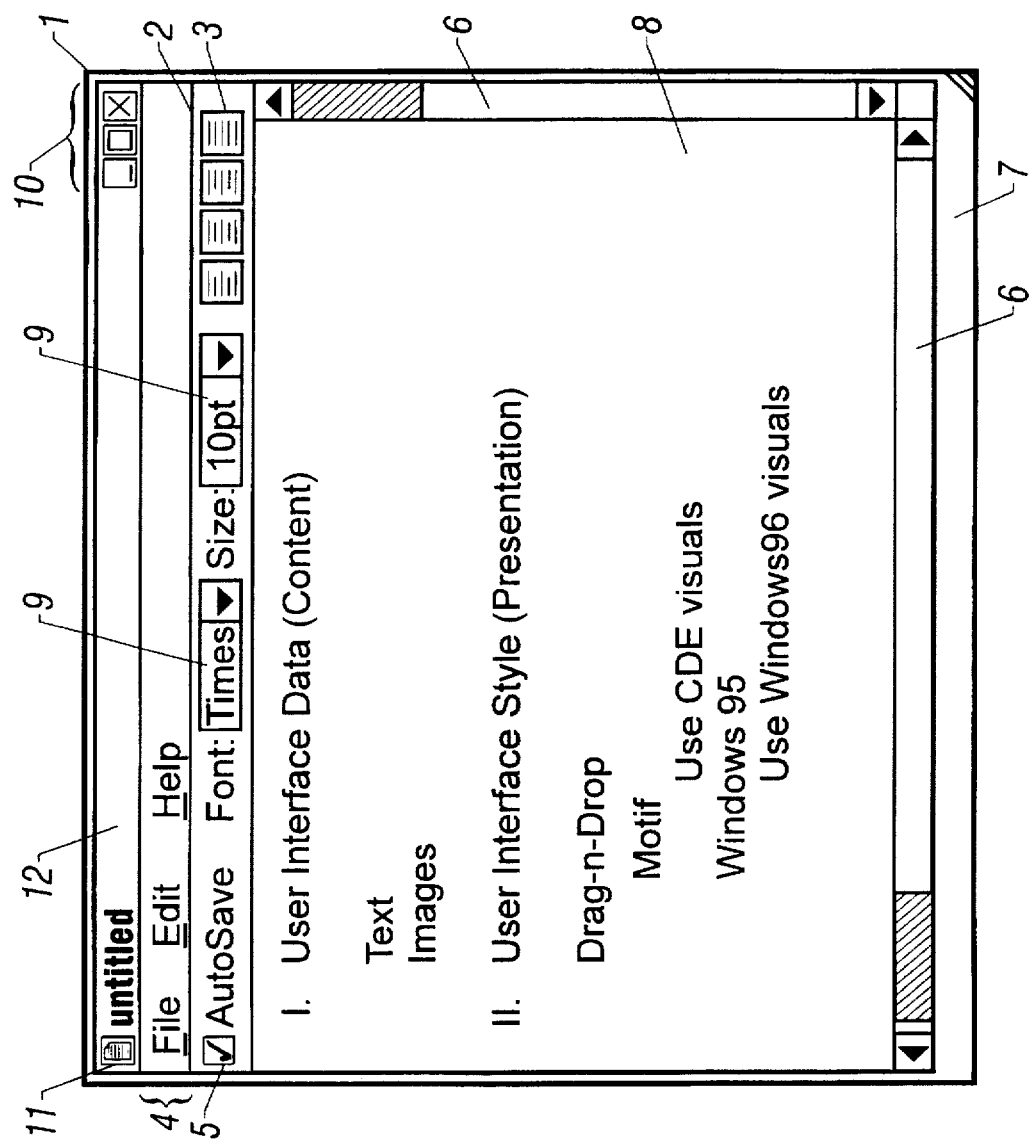
FIG. 1 is a screen shot showing an exemplary representation of a word processor having a Windows95 visual style created using the invention.

Throughout this description, the preferred embodiment and examples shown should be considered as exemplars, rather than as limitations on the present invention.

Overview

The preferred embodiment of the invention is targeted for use on a system comprising, for example, a processor, a display device, at least one input devices such as a pointing device or keyboard, and other input and output devices connected together via a network to other systems, personal computers, workstations, servers, printers, and other computing and peripheral equipment. Use of the invention allows a user to select from a variety of different visual styles for a user interface. For example, a user could configure a word processing application to appear like either of the examples in FIG. 1 or FIG. 2, regardless of the actual underlying operating system. Thus, a user can have a Windows95 style for applications running under the UNIX operating system, or a Motif style for applications running under the Macintosh System 7 operating system. Further, the user can add to or change the functionality of an application by defining additional controls for an application.

The preferred embodiment of the invention includes an icon server, an image cache, a UIL server, a UIL user interface description, a UIL parser, user interface controls or "widgets", widget geometry manager objects, an event object, event handlers, a Widget Registry, an Event Handler Registry, an Event Name Registry, a visual style object, and a user interface within which a user can switch visual styles.

The UIL provides the syntax and grammar rules for describing a user interface. The UIL user interface description is preferably a text file, in a format similar to various text-markup languages, such as HTML (Hyper Text Markup Language). Since the UIL user interface description is a text file that is parsed during interpretation, corruption of the file can be readily detected and handled in error routines. However, the UIL description may also be compiled to a binary format and/or compressed to reduce size.

In the preferred embodiment, the PGUI resident in a user's computer system initially loads a UIL user interface description from a UIL server via a protocol such as the NFS protocol, the World Wide Web (WWW) HTTP protocol, or other network protocols. Alternatively, the UIL user interface description can be loaded from a local storage unit. The UIL user interface description describes the controls or widgets that comprise the user interface. In the preferred embodiment, the UIL user interface description allows a user to set widget attributes. Examples of such attributes include: name, icon, width, height, uil_ID, parentID, layout manager, widget EventHandler, and other attributes. The PGUI allows the user to add or delete widgets via dragging and dropping the widgets with a pointing device, thus changing the description of the user interface. Once changed, the PGUI can save a copy of the description on a UIL server, a local storage unit, or other storage means, for later retrieval.

User Interface

Figure 2:
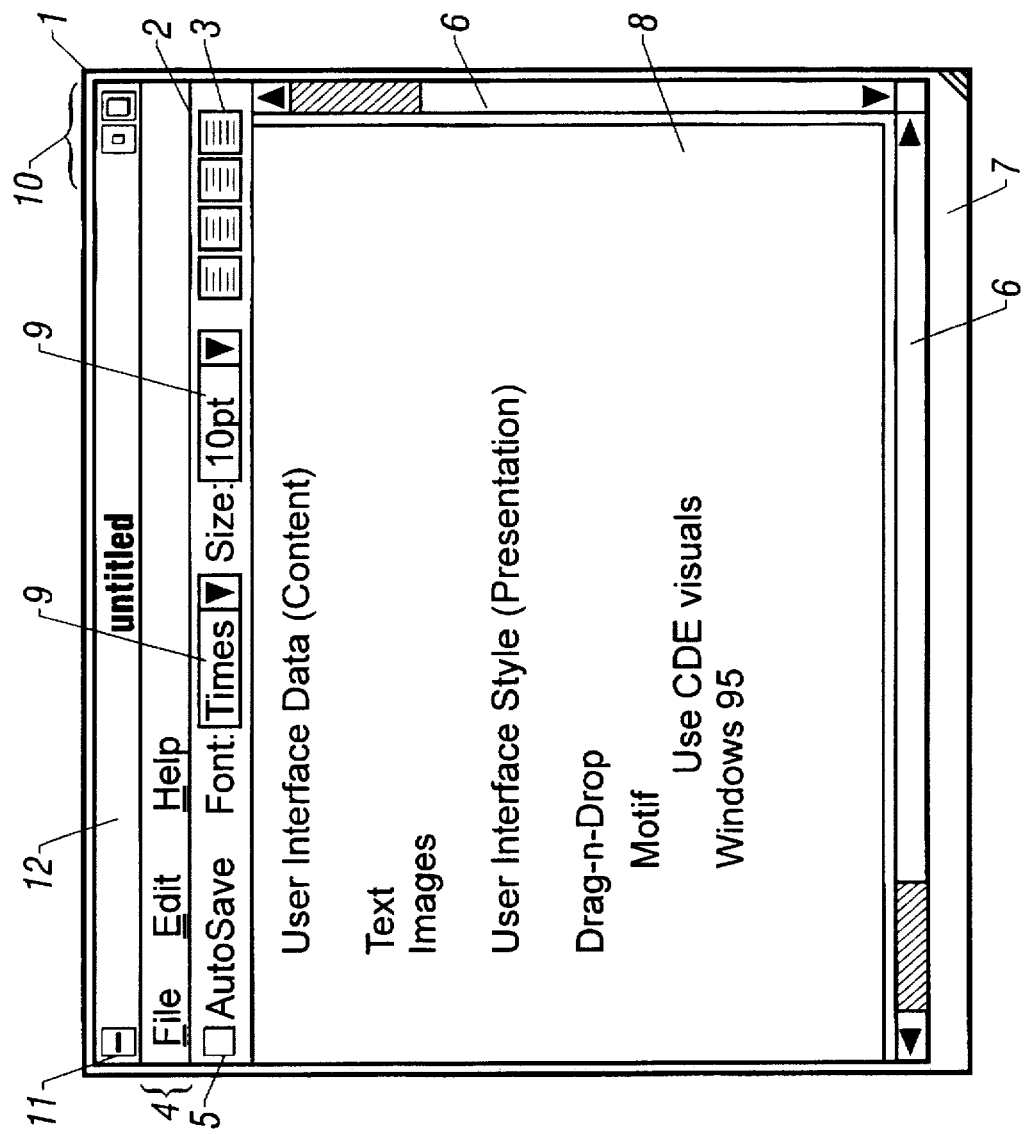
FIG. 2 is a screen shot showing an exemplary representation of the word processor of FIG. 1, but having a Motif visual style created using the invention.

A user interface comprises one or more interface widgets. FIGS. 1 and 2 show some of the user interface widgets currently being used by those skilled in the art of user interface design: a window 1, separator 2, toolbar buttons 3, menu bar 4, radiobutton 5, sliders 6, status bar 7, content area 8, dropdown listboxes 9, window control buttons 10, window icon 11, and title bar 12. However, conventional applications define such an interface as essentially a monolithic entity. An important aspect of the invention is that it defines a user interface in terms of parts, separating widgets, widget functionality, and widget attributes so as to permit extremely fine control of a user interface in each UIL user interface description. Listing 1 below illustrates an example UIL user interface description in accordance with the invention that describes the user interface illustrated in FIGS. 1 and 2.

Lising 1 - textEditor.uil

```
</widget><widget WindowFrameWidget>
<attribute width=400>
<attribute height=300>
<attribute uilID="mainWindow">
</widget>
<widget TitleBarWidget>
<attribute uilID="titleBarPanel">
<attribute name="untitled">
<attribute parentID="mainWindow">
<attribute geometryManager="TitleBarLayout">
<attribute icon="http://www.triteal.com/icons/data.gif">
</widget>
<request>
<attribute eventID="LOAD">
<attribute eventArg="menuBar.uil">
<attribute parentID="mainWindow">
</request>
<widget SeparatorWidget>
<attribute shadowWidth="1">
<attribute parentID="mainWindow">
</widget>
<widget ToolbarWidget>
<attribute geometryManager="HorizontalLayout">
<attribute parentID="mainWindow">
<attribute uilID="toolBar">
</widget>
<widget RadioButtonWidget>
<attribute parentID="toolBar">
<attribute isSet="true">
<attribute name="Auto Save">
</widget>
<widget DropDownListBoxWidget>
<attribute parentID="toolBar">
<attribute label="Font:">
<attribute uilID="font">
<attribute value="Times">
</widget>
<widget DropDownListBoxWidget>
<attribute parentID="toolBar">
<attribute name="Size:">
<attribute uilID="size">
<attribute value="10pt">
</widget>
<widget ToolbarButtonWidget>
<attribute parentID="toolBar">
<attribute icon="leftjustified.gif">
<attribute useIconServer="true">
</widget>
<widget ToolbarButtonWidget>
<attribute parentID="toolBar">
<attribute icon="centered.gif">
<attribute useIconServer="true">
</widget>
<widget ToolbarButtonWidget>
<attribute parentID="toolBar">
<attribute icon="rightjustified.gif">
```

Lising 1 - textEditor.uil

```
   <attribute useIconServer="true">
</widget>
<widget ToolbarButtonWidget>
   <attribute parentID="toolBar">
   <attribute icon="fulljustified.gif">
   <attribute useIconServer="true">
</widget>
<widget ScrollableAreaWidget>
   <attribute parentID="mainWindow">
   <attribute uiID="workArea">
</widget>
<widget StatusBarWidget>
   <attribute name=" ">
   <attribute parentID="mainWindow">
</widget>
<request>
   <attribute parentID="workArea">
   <attribute eventID="URL_OPEN">
   <attribute eventArg="http://www.triteal.com/UIPatent.txt">
</request>
```

Not all widgets have all attributes, but each widget succinctly describes the characteristics of each part of the user interface for an example text editor application. Thus, for example, the first widget, WindowFrameWidget, defines a window 1 (see FIG. 1) having an initial width of 400 screen units and a height of 300 screen units, with a handle or uiIID of "mainWindow". The SeparatorWidget defines a separation bar 2 having a shadow width attribute of "1", and a parentID attribute of "mainWindow". Thus, the SeparatorWidget inherits the attributes of the WindowFrameWidget.

As another example, there are several toolbar button widgets 3, one of which has an icon attribute of "fulljustified.gif", which references a graphical image in a conventional GIF file format to be shown on the button 3. As yet another example, a menu bar user interface 4 is defined by reference, using a request function described below.

The UIL description in Listing 1 defines each part of the application interface without initially dictating a visual style. Simple changes to the UIL description permit changes to the parts of the application interface, by adding, subtracting, or changing widgets. Because the parts of an application can be defined so succinctly, retrieving a UIL user interface description over a network link is rapid—much more so than retrieving several megabytes of an application.

In building a user interface, the PGUI retrieves icons (e.g., graphics, pictures, bitmaps, etc.) that represent objects from an icon server via similar network protocols used by the UIL server. Alternatively, the icons could also be retrieved from a local storage device. The icon server may be the same as the UIL server. In the preferred embodiment, the PGUI places the retrieved icons in an image cache. The advantage of caching icons is that when other widgets reference the same icon, the PGUI accesses the cache instead of retrieving the icon from the icon server again. For example, an application that shows a directory's files may use icons to represent the files in the directory. Such a directory may contain hundreds of files. The application may also allow the user to traverse the directory hierarchy. The act of traversing a file system could quickly create thousands of accesses to icons in just a few minutes. Retrieving the same icons from cache for each needed instance is faster than file system retrieval. Thus, an image cache enhances the performance of the overall PGUI.

As the PGUI is retrieving a user interface description from the UIL server, it uses a UIL parser in parallel to create each part defined in that description. The UIL user interface description includes information that allows the PGUI to create a "widget registry" based on the uiIID attribute. In the preferred embodiment, the PGUI uses the parentID attribute to create a hierarchy or registry of widgets, where each "parent" widget is the widget whose uiIID equals the parentID of a "child" widget. The PGUI may also load in other UIL files, which allows it to create compound or complex user interfaces. For example, the PGUI, in parsing Listing 1, retrieves the menu bar user interface 4 described in Listing 2 below via a request feature of the UIL. A request includes the concept of an environment: the environment contains the parentID attribute which allows the PGUI to create a correct hierarchical relationship. The principle advantage of describing user interfaces with requests allows the sharing of common user interface components.

Lising 2 - menuBar.uil

```
<widget MenuBarWidget>
   <attribute widgetEventHandler="PopupMenuHandler">
   <attribute geometryManager="HorizontalLayout">
   <attribute uiIID="menuBar">
</widget>
<widget MenuButtonWidget>
   <attribute parentID="menuBar">
   <attribute mnemonic="F">
   <attribute PopupMenu="FileMenu">
   <attribute widgetEventHandler="PopupMenuHandler">
   <attribute name="File">
</widget>
<widget MenuButtonWidget>
   <attribute parentID="menuBar">
   <attribute mnemonic="E">
   <attribute PopupMenu="EditMenu">
   <attribute subMenuId="EditMenu">
   <attribute name="Edit">
</widget>
<widget MenuButtonWidget>
   <attribute parentID="menuBar">
   <attribute PopupMenu="HelpMenu">
   <attribute subMenuId="HelpMenu">
   <attribute mnemonic="H">
   <attribute name="Help">
```

The widget registry also serves as a widget cache. Thus, the PGUI has the same performance benefits when accessing widgets as those described above for the image cache.

Referencing Listing 1 and Listing 2 again, the UIL geometryManager attribute provides the widget programmer a way to separate geometry management (i.e., widget positioning and sizing) from widget functionality. For example, both the MenuBarWidget and the ToolBarWidget controls use the HorizontalLayout geometry manager to position and size children widgets. Thus, children widgets do not need to position or size themselves, but only need to provide button widget functionality, such as responding to input events from pointing devices, a keyboard, or other input devices. Another advantage is that a widget programmer can reuse the geometry manager in different widgets or use different geometry managers in the same widget.

Events

In the preferred embodiment, the invention uses an event object to invoke actions, such as loading a UIL user interface description file and any other actions known to those skilled in the art. Event handlers provide the functionality for each user interface control. The event handlers respond to events input device events (e.g., keyboard input, mouse input, touch screen input, etc.), system events, user defined events, and other events known to those skilled in the art. In the preferred embodiment, if an event handler can service or handle an event, it returns true, otherwise it returns false and the event propagates to the parent widget. An example of a radio button event handler is shown below:

```
public class RadioButtonEventHandler extends EventHandler
{
    Widget currentRadioButton;
    public boolean handleEvent(Event event, Widget widget)
    {
        if (event.id equals Event.MOUSE_UP)
        {
            Event evt = new Event(Event.CHANGE_STATE);
            currentRadioButton.state = unselected;
            currentRadioButton.postEvent(evt);
            currentRadioButton = widget;
            widget.state = selected;
            widget.postEvent(evt);
            return true;
        }
        return false;
    }
}
```

In this example, the event handler responds to an input device event, in particular, a MOUSE_UP event (i.e., detection of the release of a mouse button). The event handler changes the state of the current radiobutton and then creates a new system event, CHANGE_STATE, and sends the new event to the current selected radiobutton by calling the postEvent function. An event handler can also have state information. The current radiobutton selected is the event handler's state. After setting its state, the event handler sets the new current radiobutton's state to selected and then sends the CHANGE_STATE event to the radiobutton. Finally, the event handler returns true. If the event was anything other than a MOUSE_UP event, the handler does nothing and returns false; the PGUI then propagates the event to the parent widget. An advantage of using event handlers is that a widget programmer can reuse event handlers in different widgets or use different event handlers in the same widget.

The invention provides a method for the user to add functionality to the PGUI through the UIL user interface description. The user can use the request feature to register new events in an event handler registry and the event name registry. An example of such use is set forth in Listing 3:

Listing 3 - changeStyle.uil

```
<request>
<attribute eventID="REGISTER_EVENT">
<attribute eventName="SwitchStyle">
<attribute eventHandler="SwitchStyleEventHandler">
</request>
<widget WindowFrameWidget>
<attribute width=220>
<attribute height=155>
<attribute widgetEventHandler="PropertySheetEventHandler">
<attribute type="dialog">
<attribute geometryManager="MainWindowLayout">
<attribute uiID="mainWindow">
</widget>
<widget TitleBarWidget>
<attribute uiID="titlebarPanel">
<attribute parentID="mainWindow">
<attribute name="Change Style">
</widget>
<widget PropertyWidget>
<attribute parentID="mainWindow">
<attribute applyEventID="SwitchStyle">
```

-continued

Listing 3 - changeStyle.uil

```
<attribute uiID="lookFeelPropertySheet">
</widget>
<widget GroupBoxWidget>
<attribute name="Styles">
<attribute parentID="lookFeelPropertySheet">
<attribute geometryManager="VerticalLayout">
<attribute parentID="styleRangeGroup">
<attribute uiID="styleRange">
<attribute widgetEventHandler="RadioButtonEventHandler">
</widget>
<widget RadioButtonWidget>
<attribute parentID="styleRange">
<attribute isSet="true">
<attribute name="Windows95">
<attribute styleClass="Win95Style">
</widget>
<widget RadioButtonWidget>
<attribute parentID="styleRange">
<attribute name="Motif">
<attribute styleClass="MotifStyle">
</widget>
<widget ButtonWidget>
<attribute name="OK">
<attribute parentID="mainWindow">
<attribute uiID="OK">
</widget>
<widget ButtonWidget>
<attribute name="Cancel">
<attribute eventID="WINDOW_CLOSE">
<attribute parentID="mainWindow">
<attribute uiID="Cancel">
</widget>
```

In this example, the PGUI responds to the system event called REGISTER_EVENT by assigning an event ID to the eventName attribute's value and storing the ID and event name in an event name registry. The PGUI then loads the eventhandler attribute's value and stores the ID and event handler in an event handler registry. In this example, the PGUI registers the SwitchStyle name in the event name registry and the SwitchStyleEventHandler in the event handler registry. The SwitchStyle event is now available for use. The PropertyWidget control's applyEventID attribute's value makes reference to the SwitchStyle event. When the property widget receives an Apply event (i.e., a command to apply a style), the property widget can retrieve the SwitchStyle event ID from the event name registry and then use that event ID to retrieve the SwitchStyleEventHandler from the event handler registry.

Visual Styles

An important aspect of the invention is that it provides a visual style object as a means for switching visual styles for the widgets defined in a basic UIL user interface description. Such visual style objects can be defined in the same UIL user interface description file, or be stored in a separate file. FIGS. 1 and 2 show in detail two different visual styles.

The visual styles use different colors (shown as shades in the figures), border widths, widget spacing, widget widths, text alignment, and shadowing or bordering techniques. The style objects also draw different widgets differently, such as the WindowControlsWidget control 10. Some controls are not drawn in various styles. For example, the Title barWidget control 12 depicted in FIG. 2 (the Motif style) lacks a WindowCloseButton widget, but the TitlebarWidget control 12 depicted in FIG. 1 (the Windows95 style) has one. However, regardless of visual style, any displayed widget performs the same function.

The following object definition shows an example visual style object in accordance with the present invention:

```
class Style
{
    private static Style currentStyle = null;
    void setCurrentStyle(Style style)
    {
        currentStyle = style;
    }
    Style getCurrentStyle ()
    {
        if (currentStyle = null)
            currentStyle = load("MotifStyle");
        return currentStyle;
    }
    int getAlignment(int ui_type)
    {
        return LEFT;
    }
    boolean showControl(int ui_type)
    {
        return true;
    }
    void drawArrow(Graphics graphics,
            int x, int y,
            int width, int height,
            int shadowType,
            int state, int ui_type)
    {
    }
    void drawRadio(Graphics graphics,
            int x, int y,
            int width, int height,
            int shadowType,
            int state, int ui_type)
    {
    }
    void drawCheckBox (Graphics graphics,
            int x, int y,
            int width, int height,
            int shadowType,
            int state, int ui_type)
    {
    }
    void drawBorder (Graphics graphics,
            int x, int y,
            int width, int height,
            int shadowType,
            int uiType, int state)
    {
    }
    Font getFont(int ui_type, int state)
    {
        return helvetica;
    }
    Color getBackground(int ui_type, int state)
    {
        return lightGray;
    }
    Color getForeground(int ui_type, int state)
    {
        return black;
    }
    Color getSelectColor(int ui_type, int state)
    {
        return white;
    }
}
```

This basic style is used as a template for the visual characteristics of various widgets or widget elements, such as position, width, height, shadow type, state, etc. The PGUI can determine the current style by calling a getCurrentStyle function. Likewise, the PGUI can set the current style by calling a setCurrentStyle function. If the user does not set a visual style, the visual style object loads a default style. In the above example, the visual style object loads the Motif style using the getCurrentStyle function.

The visual style object, by means of calling functions, abstracts the methods by which the PGUI determines the color, font, alignment, visibility, and other attributes of the visual style of widgets. In the preferred embodiment, the attribute functions require at least one parameter, a user interface indicator, such as MenuBar or ScrollableArea that identifies the widget type to the style object. Some attribute functions require a second parameter which contains the state of the widget, such as selected, visible, active, pressed, iconified, and other user interface states. The two following visual style object definitions provide examples of how the PGUI can display the same user interface in multiple visual styles. Each definition extends the basic definition set forth above. The first definition defines a Motif-type visual style, while the second definition defines a Windows95-type visual style.

```
class MotifStyle extends Style
{
    class MotifColor(Color bg, Color fg)
    {
        Color background = bg;
        Color foreground = fg;
    }
    MotifColor   normalColors=new MotifColor(ltGray, black);
    MotifColor   activeWinMgrColor=new  MotifColor (ltGreen, white)
    MotifColor   inactiveWinMgrColor=new  MotifColor (dimGray, black);
    Color getBackground(int uiType, int state)
    {
        Color color = normalColors.background;
        if (uiType is TitleBar)
        {
            if (state is selected)
                color = activeWinMgrColors.background;
            else
                color = inactiveWinMgrColors.background;
        }
        return color;
    }
}
class Win95Style extends Style
{
    int WindowForeground = 0;
    int WindowBackground = 1;
    int TitleSelectedBackground = 2;
    int Titleackground = 3;
    Color colors[] = new Color[4];
    colors[WindowForeground] = black;
    colors[WindowBackground] = white;
    colors[TitleBackground] = mediumGray;
    colors[TitleSelectedground] = darkBlue;
    Color getBackground(int uiType, int state)
    {
        int color = WindowBackground;
        if (uiType is TitleBar)
        {
            if (state is selected)
                color = TitleSelctedBackground;
            else
                color = TitleBackground;
        }
        return colors [color];
    }
}
```

Referring to the above examples, the preferred embodiment of the invention provides a method by which a visual style's attributes can be determined regardless of the style. The examples show that the state, the user interface type, and the current visual style setting determine the background and other visual style attributes. Referring to the above Motif-type visual style object, the definition indicates to one skilled in the art that the TitleBarWidget control's background is ltGreen when the control is selected and the background is dimgray when the control is not selected. Referring to the above Window95-type visual style object, the definition indicates that the TitleBarWidget control's background is darkBlue when the control is selected and the background is mediumGray when the control is not selected.

The preferred embodiment of the invention also provides a method by which a visual style's controls can be displayed or drawn regardless of the style. The following examples show that the state, the user interface type, and the current visual style setting determine how a user interface control is displayed.

Figure 3:
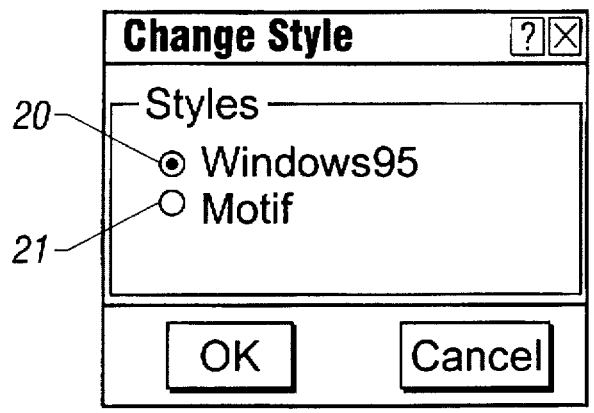
FIG. 3 is a screen shot showing details of a Windows95 visual style for a radiobutton widget.
Figure 4:
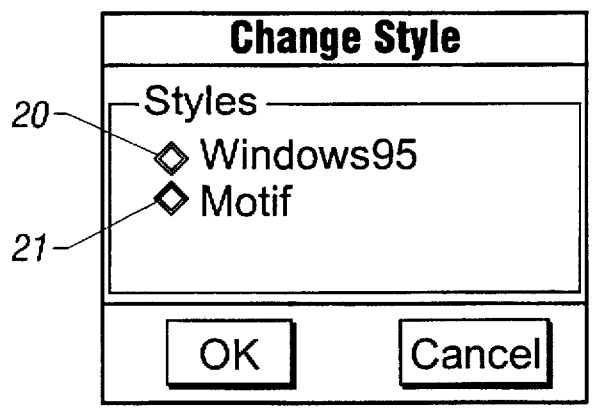
FIG. 4 is a screen shot showing details of a Motif visual style for a radiobutton widget.

FIG. 3 shows a pair of RadioButtonWidget controls 20, 21 using the Windows95 visual style. FIG. 4 shows the same RadioButtonWidget controls 20, 21 using the Motif visual style. An example of the basic RadioButtonWidget object definition is shown below. When the PGUI needs to display a control, the PGUI calls the widget's paint function. Within the scope of the paint function, the PGUI calls the getCurrentStyle function to retrieve the current style. The PGUI can then retrieve and use the style's attributes. For example the PGUI uses the retrieved background color to fill in the background of the RadioButtonwidget control. The example below shows how the RadioButtonWidget controls 20, 21 display themselves in the different styles of FIGS. 3 and 4 by calling the current style's drawRadio function:

```
public class RadioButtonWidget extends Widget
{
    RadioButtonWidget ()
    {
        uiType = Style.RadioButton;
        state = Style.NormalState;
    }
    void paint(Graphics g)
    {
        Style style = Style.getCurrentStyle();
        Color background = style.getBackground(uiType, state);
        g.setColor(background);
        g.fillRectangle(x,y, width, height);
        style.drawRadio(g,x,y, width, height, state, uiType);
    }
}
```

The following example shows one embodiment of a visual style object used to draw the RadioButtonWidget controls 20,21 in FIG. 3. The PGUI draws the round radio buttons by calling a drawArc function. If the state is selected, the PGUI calls a fillCircle function to indicate that the control is selected, as depicted in the first radio button 20 in FIG. 3.

```
class Win95Style extends Style
{
    void drawRadio(Graphics graphics,
            int x, int y,
            int width, int height,
            int shadowType,
            int state, int uiType)
    {
        g.setColor(colors[WindowBackground]);
        g.fillArc(x + 1, y + 1, width - 3, height - 3, 0, 360)
        g.setColor(colors[ButtonHilightColor]);
        g.drawArc(x, y, width - 1, height - 1, 225, 180);
        g.setColor(colors[ButtonFaceColor]);
        g.drawArc(x + 1, y + 1, width - 3, height - 3, 225, 180)
        g.setColor(colors[ButtonShadowColor]);
        g.drawArc(x, y, width - 1, height - 1, 45, 180);
        g.setColor(colors [WindowFrameColor]);
        g.drawArc(x + 1, y + 1, width - 3, height - 3, 45, 180)
        if (state is SelectState)
```

-continued

```
        {
            g.setColor(colors[WindowForeground]);
            g.fillCircle(x + 5, y + 5, 4);
        }
    }
}
```

The following example shows another embodiment of a visual style object used to draw the RadioButtonWidget controls 20,21 in FIG. 4. The PGUI draws the diamond shaped buttons by calling the getRadioPoints function to calculate the points, and then by calling drawLine functions to draw the edges. If the state is selected, the PGUI switches the top and bottom shadow colors to achieve a pressed visual appearance, as depicted by the second radio button 21 in FIG. 4.

```
class MotifStyle extends Style
{
    void getRadioPoints(int x, int y,
                int width, int height,
                int xPoints[], int yPoints[])
    {
        width = width - 1;
        height = height - 1;
        int i = 0;
        int x0 = x + width / 2;
        int y0 = y + height / 2;
        xPoints[i] = x;
        yPoints[i] = y0;
        i = i + 1;
        xPoints[i] = x0;
        yPoints[i] = y;
        i = i + 1;
        xPoints[i] = x + width;
        yPoints[i] = y0;
        i = i + 1;
        xPoints[i] = x0;
        yPoints[i] = y + height;
    }
    void drawRadio(Graphics g,
                int x, int y,
                int width, int height,
                int shadowType,
                int state, int uiType)
    {
        Color bg = getBackground(uiType, state);
        int xPoints[] = new int[4];
        int yPoints[] = new int[4];
        getRadioPoints(x, y, width, height, xPoints, yPoints);
        g.setcolor(getBackground(uiType, state));
        g.fillPolygon(xPoints, yPoints, 4);
        Color topShadow;
        Color bottomShadow;
        if (state is pressed or state is selected)
        {
            topShadow = bg.getBottomShadow();
            bottomShadow = bg.getTopshadow();
        }
        else
        {
            topShadow = bg.getTopShadow();
            bottomShadow = bg. getBottomShadow ();
        }
        int i = -1;
        while (i lessThan shadowWidth)
        {
            g.setcolor (bottomShadow);
            g.drawLine(xPoints[0], yPoints[0], xPoints[3], yPoints [3]);
            g.setColor (topShadow);
            g.drawLine(xPoints[1], yPoints[1], xPoints[2], yPoints [2]);
            g.setcolor(bottomShadow);
            g.drawLine(xPoints[3], yPoints[3], xPoints[2],
```

```
        yPoints [2]);
        g.setColor(topShadow);
        g.drawLine(xPoints[0], yPoints[0], xPoints[1],
        yPoints [1]);
        i = i + 1;
        if (i lessThan shadowWidth)
        {
            x = x + 1;
            y = y + 1;
            width = width - 2;
            height = height - 2;
            getRadioPoints(x, y, width, height, xPoints,
            yPoints);
        }
    }
}
```

A user may switch between visual styles in any convenient way, such as by selection a radiobutton in a dialog, by menu selection, icon selection, etc. FIGS. 3 and 4 show an example of a dialog by which such a selection may be made. The PGUI responds by setting the current style to the desired style, repositions and resizes all displayed widgets, and finally redraws the user interface.

Implementation

The invention may be implemented in hardware or software, or a combination of both. However, preferably, the invention is implemented in computer programs executing on programmable computers each comprising at least one processor, at least one data storage system (including volatile and non-volatile memory and/or storage elements, any of which may be local or accessible via a network), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system, although the programs can be implemented in assembly or machine language, if desired. In any case, the language may be a compiled or interpreted language. However, in the preferred embodiment, the invention, particularly the PGUI, is implemented in the JAVA programming language. With the introduction of Java, it is possible now to bring small JAVA applications called "applets" from a server to a client and execute such applications locally. Because JAVA compiles to intermediate host machine independent code, the compiled JAVA applets can run on any host that has a Java Virtual Machine (JVM).

Each such computer program is preferably stored on a storage media or device (e.g., ROM or magnetic diskette) readable by a general or special purpose programmable computer, for configuring and operating a local or remote computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

SUMMARY

The basic invention may be summarized as follows:
(1) A user interface definition for an application is created describing each part of a user interface in terms of at least distinct function attributes, appearance attributes, and parent-child inter-widget relationship attributes.
(2) On launching an application on a client, a PGUI resident on the client retrieves the corresponding user interface definition from a storage device, preferably on a server.
(3) The PGUI parses the user interface definition and creates each part of the application user interface in accordance with the defined attributes.
(4) The PGUI retrieves a defined visual style object (user-defined or a default style), and renders the appearance of each part of the user interface in accordance with the defined visual style.
(5) The PGUI displays the user interface rendered in the specified style for response to events and for display of content.
(6) The PGUI responds to any event affecting apart of the user interface in accordance with the functional attribute of that part, or in accordance with the functional attribute of a parent part of such part.
(7) The PGUI renders the appearance of each part of the user interface in accordance with any newly selected visual style, and redisplays the changed user interface for response to events and for display of content.

The example UIL user interface description listings above show one embodiment of a user selectable and definable interface in accordance with the invention. The PGUI could use any UIL user interface description provided that a UIL parser exists, or a translator program exists that transforms one UIL to another UIL for which a UIL parser exists. The PGUI can use standard techniques in determining what UIL parser to use, such as filename extensions and other categorical techniques. Because the PGUI determines what UIL parser to use, a UIL user interface description file can use the request feature to load user interface components which are described with a different UIL. This capability is useful in a global environment where a UIL user interface description may be in a user's native natural language.

It should be understood that the above description illustrates a specific embodiment of the invention. The preferred embodiment illustrates one visual style shown on a display screen, but the same visual style could also be shown on many separate display screens attached to systems which are connected to a network. In the network environment, changing a user interface attribute would change the attribute in the other display screens as well. Another embodiment of the invention could display multiple visual styles simultaneously on one display screen where each window or application on the screen has a visual style.

Accordingly, the invention provides at least the following advantages: a method to present a user interface with multiple selectable visual styles defined in a simple markup-text form that can be quickly retrieved from a server to define a user interface on a client; a means for reducing security risks inherent when loading applications from servers by avoiding use of machine code in defining a user interface; a method to separate the functionality of user interface controls from the display of the user interface controls, and a method to separate the functionality of an application from the display of the user interface; a simple method for adding new functionality and new controls to a user interface.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for allowing a user to retrieve a user interface, including at least one control, and a visual style for each control, rapidly display the visual stylized user interface, and dynamically switch between visual styles for each control, comprising the steps of:

(a) creating a user interface definition describing at least one part of a user interface in terms of at least distinct function attributes, appearance attributes, and parent-child inter-control relationship attributes;

(b) retrieving the user interface definition;

(c) parsing the user interface definition and creating each part of the user interface in accordance with the defined function attributes, appearance attributes, and parent-child inter-control relationship attributes;

(d) retrieving a defined visual style object and rendering an appearance for each part of the user interface in accordance with the defined visual style;

(e) displaying the user interface rendered in the specified style for response to events and for display of content.

2. The method of claim 1, further comprising the step of:

(a) responding to any event affecting a part of the user interface in accordance with the functional attribute of that part, or in accordance with the functional attribute of a parent part of such part, as defined in the parent-child inter-control relationship attribute for such part.

3. The method of claim 1, further comprising the steps of:

(a) rendering the appearance of each part of the user interface in accordance with any newly selected visual style; and (b) redisplaying the user interface rendered in the newly selected style for response to events and for display of content.

4. The method of claim 1, wherein the defined visual object style permits the rendering of the appearance for each part to correspond to the style of a selectable operating system.

5. A system for allowing a user to retrieve a user interface, including at least one control, and a visual style for each control, rapidly display the visual stylized user interface, and dynamically switch between visual styles for each control, comprising:

(a) means for creating and storing a user interface definition describing at least one part of a user interface in terms of at least distinct function attributes, appearance attributes, and parent-child inter-control relationship attributes;

(b) means for retrieving the stored user interface definition;

(c) means for parsing the retrieved user interface definition and creating each part of the user interface in accordance with the defined function attributes, appearance attributes, and parent-child inter-control relationship attributes;

(d) means for retrieving a defined visual style object and rendering an appearance for each part of the user interface in accordance with the defined visual style;

(e) means for displaying the user interface rendered in the specified style for response to events and for display of content.

6. The system of claim 5, further comprising:

(a) means for responding to any event affecting a part of the user interface in accordance with the functional attribute of that part, or in accordance with the functional attribute of a parent part of such part, as defined in the parent-child inter-control relationship attribute for such part.

7. The system of claim 5, further comprising:

(a) means for rendering the appearance of each part of the user interface in accordance with any newly selected visual style; and (b) means for redisplaying the user interface rendered in the newly selected style for response to events and for display of content.

8. The system of claim 5, wherein the defined visual object style permits the rendering of the appearance for each part to correspond to the style of a selectable operating system.

9. A computer program, residing on a computer-readable medium, for allowing a user to retrieve a user interface, including at least one control, and a visual style for each control, rapidly display the visual stylized user interface, and dynamically switch between visual styles for each control, the computer program comprising instructions for causing a computer to:

(a) create and store a user interface definition describing at least one part of a user interface in terms of at least distinct function attributes, appearance attributes, and parent-child inter-control relationship attributes; p1 (b) retrieve the user interface definition;

(c) parse the user interface definition and create each part of the user interface in accordance with the defined function attributes, appearance attributes, and parent-child inter-control relationship attributes;

(d) retrieve a defined visual style object and render an appearance for each part of the user interface in accordance with the defined visual style;

(e) display the user interface rendered in the specified style for response to events and for display of content.

10. The computer program of claim 9, further comprising instructions for causing a computer to:

(a) respond to any event affecting a part of the user interface in accordance with the functional attribute of that part, or in accordance with the functional attribute of a parent part of such part, as defined in the parent-child inter-control relationship attribute for such part.

11. The computer program of claim 9, further comprising instructions for causing a computer to:

(a) render the appearance of each part of the user interface in accordance with any newly selected visual style; and (b) redisplay the user interface rendered in the newly selected style for response to events and for display of content.

12. The computer program of claim 9, wherein the defined visual object style permits the rendering of the appearance for each part to correspond to the style of a selectable operating system.

* * * * *